Feb. 6, 1940.   R. D. DUMONT   2,189,341
CONTAINER CUTTER
Filed May 18, 1939

INVENTOR
R. Duval Dumont
BY
Emery, Varney, Whittemore & Dix
ATTORNEYS

Patented Feb. 6, 1940

2,189,341

UNITED STATES PATENT OFFICE 2,189,341

CONTAINER CUTTER

Reiman Duval Dumont, New York, N. Y.

Application May 18, 1939, Serial No. 274,348

7 Claims. (Cl. 30—101)

This invention relates to container cutters and has for an object the provision of improvements in this art.

The invention provides a cutter which is adapted to quickly and cleanly cut open oil filter containers to provide inspection of the contents whereby the operator may know to what extent the filter material in the container has become filled with dirt and sludge.

As marketed, oil filter containers are provided with circumferential seams forming ribs which may be utilized to guide a cutting tool. In some types of containers the ribs are narrow and in others they are wide. In some they are near the top of the container and in others they are between the ends. In the drawn steel type of container the rib is narrow and located between the ends.

The tool formed according to the present invention is provided with grooved guide rollers and sharp edged cutting rollers which are adapted to track the grooved rollers as they travel around on the ribs of the container. The grooved rollers are provided with narrow grooves adapted to ride on the narrow ribs and also with wide grooves adapted to ride on the wide ribs. Both grooves are so placed on the rollers that in either case the cutting rollers will travel very close to the side of the rib where the resistance to crushing is great and the cutting action most favorable.

The invention will best be understood by reference to an exemplary embodiment of the invention shown in the accompanying drawing wherein.

Figure 1:
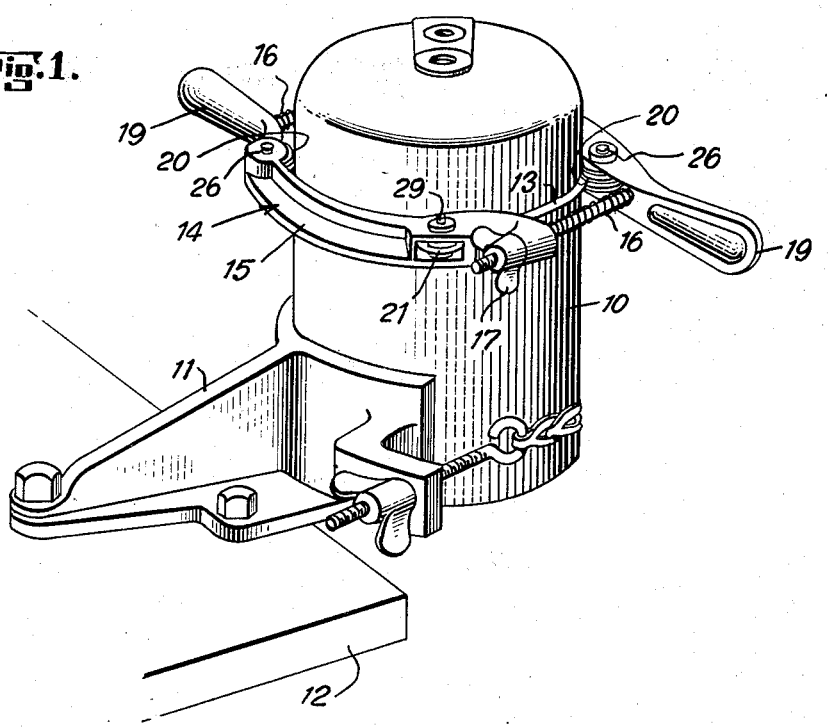
Fig. 1 is an elevational perspective view showing the cutting device used for opening a container having a ribbed seam intermediate its ends.
Figure 2:
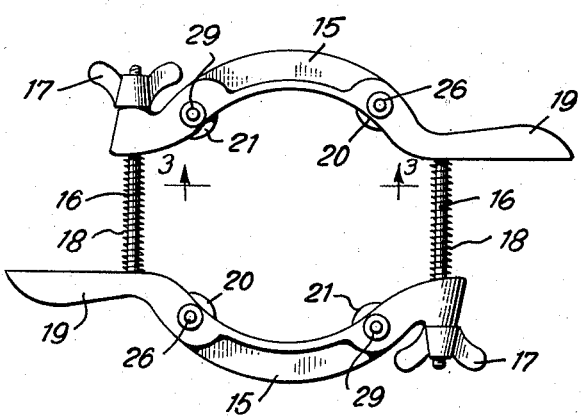
Fig. 2 is a plan view of the cutter alone.
Figure 3:
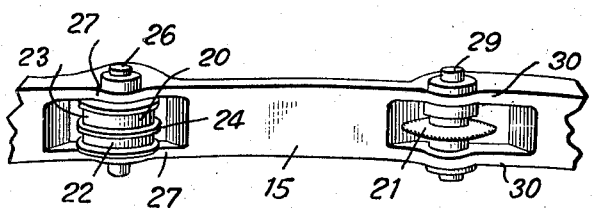
Fig. 3 is a view taken on the line 3—3 of Fig. 2.

After a container 10 has been removed from a car it may be clamped at one end in a vise 11 secured to a work bench 12. The seam rib 13, whether at one end or between the ends is then in the clear ready to receive the cutting tool 14.

In the illustrated and preferred embodiment of the invention the cutting tool comprises two spaced roller supporting members 15 adapted to be connected together by bolts 16 provided with clamping wing nuts 17. Springs 18 on the bolts keep the members 15 spaced apart whereby the tool may be easily slipped on a container. Each roller supporting member 15 is provided with an integral extension 19 adapted to serve as a handle for turning the cutter around the container.

Each member 15 is provided with a grooved guide roller 20 and a sharp edged cutting roller 21. The cutting edge of the roller 21 may be serrated for better cutting effect. The grooved roller is provided with a narrow groove 22 and a wide groove 23 separated by a rib 24. The rib 24 is aligned with the cutting roller 21 and is quite narrow in order that the cutting rollers may travel close to the edge of a rib of the container when one of the grooves 23 or 24 is riding on the container rib.

The grooved roller 20 of each member 15 is rotatably mounted on a shaft 26 secured between spaced side elements 27. Preferably a clear opening is left between the side elements 27 in order that the operator may observe whether a groove of the roller is engaged with the container rib and which groove it is.

Likewise the cutting roller 21 of each member 15 is rotatably mounted on a shaft 29 secured between spaced side elements 30. In this case also a clear opening is preferably left between the side elements 30 in order that the operator may observe whether the cutting rollers are tracking each other, that is, cutting in the same line.

By providing two cutting rollers and two grooved rollers they may be disposed in like pairs substantially opposite each other for any size of container which is to be cut. It will also be apparent that the two grooved rollers are so placed as to resist flattening or collapse of the container due to the pressure of the cutting rollers. Since two handles are provided and in opposite positions, the turning forces will also be balanced. These constructional features make it possible to cut open a container of much thinner metal than would otherwise be possible.

The cutter is made so it may be adjusted through a wide range so as to operate on containers of different sizes with equal facility.

In operation the wing nuts on the clamping bolts are turned off until the rollers will pass over the rib of the container which is to be cut open. The proper grooves are then placed on the container rib, care being taken to use the narrow grooves or the wide grooves appropriately as narrow or wide ribs on the container are encountered. Care must also be taken to place both of the cutting rollers on the same side of the container rib and on the same side as that on which the roller ribs 24 are disposed. In the present container making practice the narrow container ribs are located between the ends and the wide ribs are located at or near the end, so the cutting tool will always be in proper position if the wide roller grooves are kept uppermost.

When the rollers are evenly and snugly clamped on the container but before they are clamped very tight, the tool is given one or two turns to insure that the parts are in proper position and that the cutting rollers are tracking properly in the starting cut.

The thumb nuts are then turned up evenly and progressively after each few turns of the tool until the container is cut in two. After this the tool is opened up and removed.

It will thus be seen that the invention provides a convenient and effective but inexpensive tool for opening containers of the type described. While one embodiment of the invention has been described in detail it will be understood that the invention may be variously embodied within the limits of the prior art and the scope of the subjoined claims.

I claim as my invention:

1. A tool for cutting containers, comprising in combination, two spaced members each having a curved portion adapted to fit a circular container and each being provided at one end with an operating handle, clamping bolts passing through one end of one member and through an intermediate portion between the handle and the curved portion of the other member, clamping nuts on said bolts, springs on said bolts between said members for holding them apart, a grooved roller in each member disposed in a through opening in the member, the grooved rollers being disposed approximately opposite each other with reference to the container to be cut and each roller being formed with a wide groove and a narrow groove separated by a rib, and a cutting roller disposed in a through opening in each member, the cutting rollers being disposed approximately opposite each other and aligned with the ribs of said grooved rollers.

2. A tool for cutting containers, comprising in combination, two spaced members each having a curved portion adapted to fit a circular container and each being provided at one end with an operating handle, clamping means adjustably connecting one end of one member and an intermediate portion of the other member, springs on said clamping means between said members for forcing them apart, grooved rollers on said members disposed approximately opposite each other with reference to the container to be cut, each roller being formed with a wide groove and a narrow groove and a rib therebetween, and cutting rollers on said members disposed approximately opposite each other and aligned with the ribs of said grooved rollers.

3. A tool for cutting containers, comprising in combination, two spaced members, means for clamping said members together on a container, and oppositely disposed grooved rollers and cutting rollers mounted on said members, said grooved rollers each having spaced grooves separated by a rib, and said cutting rollers being aligned with the rib of said grooved rollers.

4. A tool for cutting containers, comprising in combination, spaced supporting members, means for clamping said members together on a container, opposed aligned tracking elements shaped to follow a guide on the container, and opposed aligned cutting elements.

5. A tool for cutting containers, comprising in combination, spaced supporting members, a tracking roller provided with a groove to follow a rib on the container, a cutting roller offset axially to one side of the groove of said roller to travel at one side of the rib of the container, and means to clamp the parts together on the container.

6. A tool for cutting containers, comprising in combination, two spaced supporting members, means for clamping said members together on a container, opposed aligned tracking elements, one on each supporting member, shaped to follow a guide on the container, and opposed aligned cutting elements, one on each supporting member, offset axially to one side of the guiding line of the tracking element to cause it to travel at one side of the guide on the container.

7. A tool as set forth in claim 6 further including tracking elements offset axially from said cutting elements and on the opposite side from said first-mentioned tracking elements.

REIMAN DUVAL DUMONT.